United States Patent
Paakkinen et al.

(10) Patent No.: US 12,187,576 B2
(45) Date of Patent: Jan. 7, 2025

(54) DRIVE SYSTEM AND METHOD FOR CONTROLLING A DRIVE SYSTEM

(71) Applicant: KONE Corporation, Helsinki (FI)

(72) Inventors: Mikko Paakkinen, Helsinki (FI); Tuukka Kauppinen, Helsinki (FI); Lauri Stolt, Helsinki (FI)

(73) Assignee: KONE CORPORATION, Helsinki (FI)

( * ) Notice: Subject to any disclaimer, the term of this patent is extended or adjusted under 35 U.S.C. 154(b) by 11 days.

(21) Appl. No.: 17/830,564

(22) Filed: Jun. 2, 2022

(65) Prior Publication Data
US 2022/0289521 A1  Sep. 15, 2022

Related U.S. Application Data

(63) Continuation of application No. PCT/EP2019/083777, filed on Dec. 5, 2019.

(51) Int. Cl.
*B66B 1/30* (2006.01)
*B66B 25/00* (2006.01)

(52) U.S. Cl.
CPC .............. *B66B 1/30* (2013.01); *B66B 25/003* (2013.01); *B66B 2201/212* (2013.01)

(58) Field of Classification Search
CPC ... B66B 1/30; B66B 25/003; B66B 2201/212; Y02B 50/00
See application file for complete search history.

(56) References Cited

U.S. PATENT DOCUMENTS 4,869,347 A * 9/1989 Takahashi ................ B66B 1/30
                                                                    187/293
5,828,014 A    10/1998 Goto et al.
(Continued)

FOREIGN PATENT DOCUMENTS

EP            2835334 A1 *  2/2015  ............. B66B 1/285
WO    WO-2011124745 A1 * 10/2011  ............... B66B 1/30
(Continued)

OTHER PUBLICATIONS

International Search Report, issued in PCT/EP2019/083777, dated Sep. 14, 2020.
(Continued)

*Primary Examiner* — Gene O Crawford
*Assistant Examiner* — Abby A Jorgensen
(74) *Attorney, Agent, or Firm* — Birch, Stewart, Kolasch & Birch, LLP

(57) ABSTRACT

A drive system for driving an electric motor includes a drive control unit and a frequency converter including a speed controller. The drive control unit is configured to: define a speed reference of the electric motor; preset operating parameters of the speed controller to provide a first response time of the speed controller, before a drive of the electric motor is initiated; adjust at least one operating parameter of the speed controller to provide a second response time of the speed controller, after the speed of the electric motor reaches a constant speed, wherein the second response time is slower than the first response time; and readjust the at least one operating parameter of the speed controller to provide the first response time, before a deceleration from the constant speed is initiated. A method is disclosed for controlling the drive system for driving the electric motor.

13 Claims, 2 Drawing Sheets

(56) References Cited

U.S. PATENT DOCUMENTS

| | | | | |
|---|---|---|---|---|
| 6,049,189 | A | * | 4/2000 | Markus .................. B66B 25/00 |
| | | | | 198/322 |
| 8,631,908 | B2 | * | 1/2014 | Schroeder-Brumloop .................. |
| | | | | B66B 1/30 |
| | | | | 187/290 |
| 8,757,328 | B2 | * | 6/2014 | Stolt ....................... B66B 1/304 |
| | | | | 187/293 |
| 9,604,818 | B2 | * | 3/2017 | Kallioniemi .......... B66B 5/0025 |
| 10,280,038 | B2 | * | 5/2019 | Ito ........................... H02P 23/20 |
| 2017/0101289 | A1 | * | 4/2017 | Stolt ........................ B66B 1/32 |

FOREIGN PATENT DOCUMENTS

| | | | | |
|---|---|---|---|---|
| WO | WO-2013094255 | A1 | * | 6/2013 .............. B66B 1/30 |
| WO | WO-2015018089 | A1 | * | 2/2015 ............. B66B 23/04 |
| WO | WO-2015063722 | A1 | * | 5/2015 .............. B66B 5/14 |

OTHER PUBLICATIONS

Invertek Drives Ltd., "Optidrive P2 Elevator User Guide V2.30", Jan. 15, 2018, total 4 pages.
Shanghai STEP Electric Corporation, "Instruction Manual for AS380 Series Elevator Integrated Drive Controller", Dec. 1, 2012, pp. 143-212.
Written Opinion of the International Searching Authority, issued in PCT/EP2019/083777, dated Sep. 14, 2020.

\* cited by examiner

DRIVE SYSTEM AND METHOD FOR CONTROLLING A DRIVE SYSTEM

CROSS REFERENCE TO RELATED APPLICATIONS

This application is a Continuation of PCT International Application No. PCT/EP2019/083777, filed on Dec. 5, 2019, which is hereby expressly incorporated by reference into the present application.

TECHNICAL FIELD

The invention concerns in general the technical field of drive systems. Especially the invention concerns drive systems for driving electric motors.

BACKGROUND

Typically, conveyors, such as elevators, comprise a drive system for controlling power feed to an electric motor of the conveyor in order to move a conveying entity, e.g. an elevator car. Moreover, the drive system controls the speed and torque of the electric motor. The drive system may comprise a drive control unit and a frequency converter. The drive control unit generates a speed reference and a torque reference to the frequency converter, which controls the speed of the electric motor according to the speed reference and the torque according to the torque reference. The frequency converter may comprise an internal speed controller, e.g. a proportional-integral (PI) controller or a proportional-integral-derivate (PID) controller. The speed controller may comprise adjustable operating parameters, which may have an effect on driving comfort experienced by a passenger(s) of the elevator car and/or on parking accuracy of the elevator car.

Especially, in high speed elevator implementations the speed controller should be able to respond substantially quickly to changes of the speed reference. At the same time, it may be preferable that the speed controller responds substantially slowly, when the speed reference is constant, i.e. the electric motor has achieved constant speed, in order to achieve smooth drive. Too slow response time may cause malfunction the conveyor because of speed differences. Too quick response time, in turn, may have an effect on the driving comfort experienced by the passenger(s) of the conveyor and/or may cause increase in a noise of the electric motor.

Typically, the operating parameters of the speed controller are kept fixedly constant and a compromise between the values of the operating parameters of the speed controller is made to achieve quick enough response time and good enough driving comfort, i.e. a smooth drive, at the same time. Typically, monitored speed signal of the electric motor and/or error signal of the speed controller may be filtered to prevent the speed controller from creating high frequency reference, which may typically create noise on electric motor and/or vibration in the conveying entity, e.g. elevator car.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a drive system for driving an electric motor and a method for controlling the driving system. Another objective of the invention is that the drive system for driving the electric motor and the method for controlling the driving system improve driving accuracy and/or driving comfort of the electric motor.

The objectives of the invention are reached by a system and a method as defined by the respective independent claims.

According to a first aspect, a drive system for driving an electric motor is provided, wherein the drive system comprises a drive control unit and a frequency converter comprising a speed controller, wherein the drive control unit is configured to: define a speed reference of the electric motor, wherein the speed reference represents the speed of the electric motor as a function of time; preset operating parameters of the speed controller of the frequency converter to provide a first response time of the speed controller, before a drive of the electric motor is initiated according to the speed reference; adjust at least one operating parameter of the speed controller of the frequency converter to provide a second response time of the speed controller, after the speed of the electric motor reaches a constant speed according to the speed reference, wherein the second response time of the speed controller is slower than the first response time of the speed controller; and readjust the at least one operating parameter of the speed controller of the frequency converter to provide the first response time of the speed controller, before a deceleration from the constant speed is initiated according to the speed reference.

The speed controller may be a proportional-integral-derivate controller, PID controller, comprising at least the following operating parameters: proportional gain, integral time, derivative time.

Alternatively, the speed controller may be a proportional-integral controller, PI controller, comprising at least the following operating parameters: proportional gain, integral time.

The at least one operating parameter of the speed controller may further comprise: filter time of the speed of the electric motor and/or filter time of an error value of the speed controller.

The drive control unit may further be configured to apply a time delay after the constant speed is achieved and before adjusting the at least one operating parameter of the speed controller of the frequency converter.

Alternatively or in addition, the drive control unit may further be configured to readjust the at least one operating parameter of the speed controller of the frequency converter with a time advance applied before the deceleration from the constant speed is initiated.

The adjusting and/or readjusting of the at least one operating parameter of the speed controller may cause adapting of one or more of the following behavior characteristics of the speed controller: a noise immunity, an overshoot, a settling time.

The drive system may be used for driving the electric motor of a conveyor, wherein the conveyor is elevator, escalator, or moving walkway.

According to a second aspect, a method for controlling a drive system for driving an electric motor is provided, wherein the drive system comprises a drive control unit and a frequency converter comprising a speed controller, wherein the method comprises: defining a speed reference of the electric motor, wherein the speed reference represents the speed of the electric motor as a function of time; presetting operating parameters of the speed controller of the frequency converter to provide a first response time of the speed controller, before a drive of the electric motor is initiated according to the speed reference; adjusting at least one operating parameter of the speed controller of the frequency converter to provide a second response time of the speed controller, when the speed of the electric motor reaches a constant speed according to the speed reference, wherein the second response time of the speed controller is slower than the first response time of the speed controller; and readjusting the at least one operating parameter of the speed controller of the frequency converter to provide the first response time of the speed controller, before a deceleration from the constant speed of the electric motor is initiated according to the speed reference.

The speed controller may be a proportional-integral-derivate controller, PID controller, comprising at least the following operating parameters: proportional gain, integral time, derivative time.

Alternatively, the speed controller may be a proportional-integral controller, PI controller, comprising at least the following operating parameters: proportional gain, integral time.

The at least one operating parameter of the speed controller may further comprise: filter time of the speed of the electric motor and/or filter time of an error value of the speed controller.

The method may further comprise applying a time delay after the constant speed is achieved and before adjusting the at least one operating parameter of the speed controller of the frequency converter.

Alternatively or in addition, the method may further comprise readjusting the at least one operating parameter of the speed controller of the frequency converter with a time advance applied before the deceleration from the constant speed is initiated.

The adjusting and/or readjusting of the at least one operating parameter of the speed controller may cause adapting of one or more of the following behavior characteristics of the speed controller: a noise immunity, an overshoot, a settling time.

The method may be implemented for driving the electric motor of a conveyor, wherein the conveyor is elevator, escalator, or moving walkway.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1:
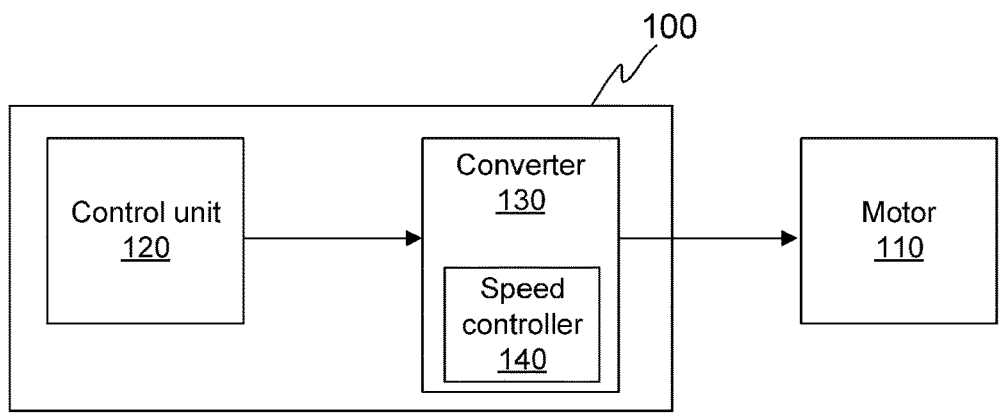
FIG. 1 illustrates schematically a simple example of a drive system according to the invention.

FIG. 1 illustrates schematically a simple example of a drive system 100 according to the invention. The drive system 100 according to the invention may be used for driving an electric motor 110 in cyclic applications, such as hoist, winch, crane, pump, blower, etc. Preferably, the drive system 100 according to the invention may be used for driving an electric motor 110 of a conveyor, such as a people conveyor. Examples of people conveyors may be an elevator, escalator, and/or moving walkway. The conveyor comprises a driving machine comprising the electric motor 110 for producing the driving force for moving a conveying entity, e.g. an elevator car, of the conveyor. The drive system 100 is configured to control power feed to the electric motor 110 in order to move the conveying entity of the conveyor. Moreover, the drive system 100 is configured to control the speed and/or torque of the electric motor 110.

According to an example embodiment of the invention, the drive system 100 may be implemented in an elevator. The elevator may comprise at least one elevator car as the conveying entity arranged to travel along an elevator shaft between landings for transferring people and/or load. The driving machine of the elevator system may be an elevator hoisting machine comprising the electric motor 110 in order to move the elevator car along the elevator shaft.

According to another example embodiment of the invention, the drive system 100 may be implemented in an escalator or moving walkway, which may be used for transferring people and/or load by means of steps or pallets arranged to an endless track as the conveying entity. The driving machine comprising the electric motor 110 may be arranged to drive the endless track by means of a sprocket or corresponding.

The drive system 100 according to the invention comprises a drive control unit 120 and a frequency converter 130. The drive control unit 120 is configured to generate, i.e. define, a speed reference of the electric motor 110 and a torque reference of the electric motor 110. The speed reference represents the speed of the electric motor 110 as a function of time. The drive control unit is configured to provide the generated speed reference of the electric motor 110 and the generated torque reference of the electric motor 110 to the frequency converter 130. The frequency converter 130 in configured to control the speed of the electric motor 110 according to the speed reference and the torque of the electric motor 110 according to the torque reference.

The frequency converter 130 comprises an internal speed controller 140. The speed controller 140 may be any type of speed controller comprising one or more adjustable operating parameters. Preferably, the speed controller 140 may be a proportional-integral (PI) controller. The adjustable operating parameters of the PI controller may comprise at least proportional gain and integral time. Alternatively, the speed controller 140 may preferably be a proportional-integral-derivate (PID) controller. The adjustable operating parameters of the PID controller may comprise at least proportional gain, integral time, and derivative time.

The operation of the speed controller 140 may be implemented e.g. with a microcontroller with embedded software or with discrete analog electronic components. The speed controller 140 defines continuously an error value as the difference between the desired speed of the electric motor 110 according to the speed reference and a measured speed of the electric motor 110, i.e. monitored actual speed of the electric motor 110. The drive system 100 may obtain the measured speed of the electric motor 110 from one or more sensors being internal or external of the drive system 100. Furthermore, the speed controller 140 applies a correction based on the operating parameters of the speed controller 140. In addition to the above described operating parameters of the PID controller and PI controller, the operating parameters of the speed controller 140 may further comprise other operating parameters, e.g. filter time of the measured speed of the electric motor 110 and/or filter time of the error value signal. The measured speed of the electric motor 110 and/or the error value signal of the speed controller 140 may be filtered to prevent the speed controller 140 from creating high frequency reference, which may create noise on the electric motor 110 and/or vibration in the conveying entity, e.g. elevator car, which is moved by means of the electric motor 110. The operating parameters of the speed controller 140 may have an effect on driving accuracy of the electric motor 110. Alternatively or in addition, when the drive system 100 according to the invention is used for driving a people conveyor, the operating parameters of the speed controller 140 may have an effect on driving comfort experienced by a passenger(s) of the conveyor. The target is to provide a smooth drive without unexpected and instantaneous movements of the conveyor entity, e.g. elevator car, caused by unexpected and instantaneous changes in the speed of the electric motor 110 in order to improve the driving comfort. The frequency converter 130 may further comprise other components for controlling the power feed to the electric motor 110.

The frequency converter 130 according to the invention comprises an adaptive adjustment functionality in order to adapt at least one behavior characteristic of the speed controller 140, e.g. a response time of the speed controller 140, based on the speed reference to improve the driving comfort. The adaptive adjustment functionality may be provided by adjusting, i.e. changing, at least one operating parameter of the speed controller 140. For example, in order to reduce the response time of the speed controller 140, the proportional gain of the speed controller 140 may be increased and in order to increase the response time of the speed controller 140, the proportional gain of the speed controller 140 may be decreased. Alternatively or in addition, in order to reduce the response time of the speed controller 140, the integral time of the speed controller 140 may be increased and in order to increase the response time of the speed controller 140, the integral time of the speed controller 140 may be decreased. Alternatively or in addition, in order to reduce the response time of the speed controller 140 the derivative time of the speed controller 140 may be increased and in order to increase the response time of the speed controller 140, the derivative time of the speed controller 140 may be decreased. Alternatively or in addition, the filtering time of the speed controller 140, e.g. filtering time of the measured speed of the electric motor 110 and/or filter time of the error value signal, may be adjusted in order to adapt the response time of the speed controller 140. The filtering behavior of the filter and thus also the effect of the adjustment of the filtering time on the response time of the speed controller 140 may depend on type of the used filter. For example, if the filter is lowpass type, in order to reduce the response time of the speed controller 140 the filter time of the speed controller 140 may be increased and in order to increase the response time of the speed controller 140, the filter time of the speed controller 140 may be decreased. Above it is discussed how the adjustment of each operating parameter of the speed controller 140 individually effects on the response time of the speed controller 140. However, if more than one operating parameter of the speed controller 140 is adjusted the combined effect on the response time of the speed controller 140 may not be as straightforward, because it depends on the operating parameters to be adjusted and the adjustment of each operating parameter (e.g. amount of the adjustment, is the adjustment increasing or decreasing, etc.).

Alternatively or in addition, to adapting the response time of the speed controller 140, the adjusting, i.e. changing, the at least one operating parameter of the speed controller 140 may cause adapting one or more other behavior characteristics of the speed controller 140. In other words, by adjusting the at least one operating parameter of the speed controller 140 different one or more other behavior characteristics of the speed controller 140 may be provided. The one or more other behavior characteristics of the speed controller 140 may comprise the noise immunity, overshoot, and/or settling time.

Figure 2:
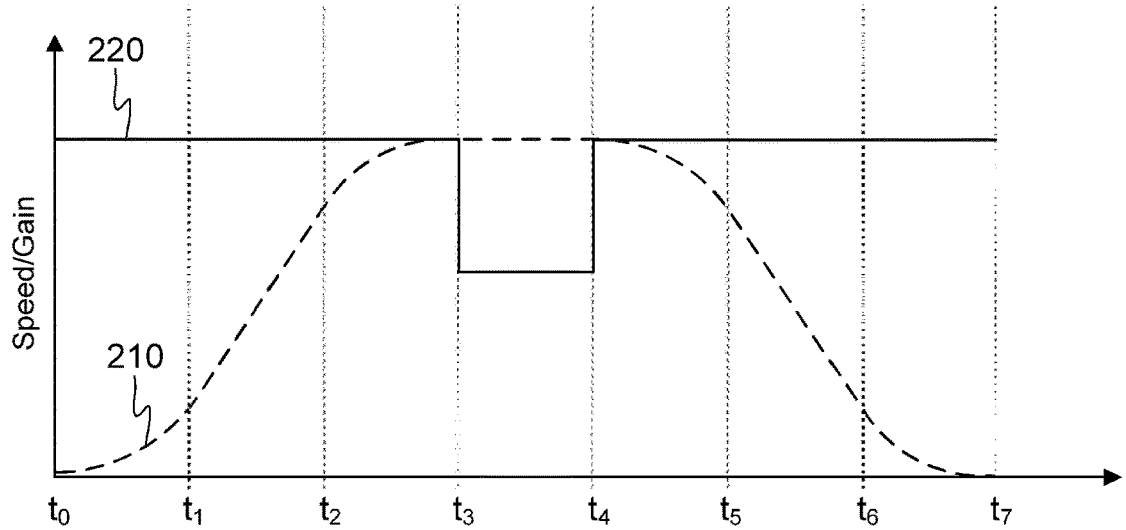
FIG. 2 illustrates an example of the state-based adaptive adjustment functionality of a frequency converter according to the invention.

According to an example embodiment of the invention, at least one operating parameter of the speed controller 140 may be adjusted according to a state of the electric motor 110. The different states of the electric motor 110 may be stationary, accelerating, constant speed, and decelerating. One or more of the states of the electric motor 110 may further comprise one or more sub-states, e.g. increasing acceleration, decreasing acceleration, constant acceleration, increasing deceleration, decreasing deceleration, constant deceleration, etc. FIG. 2 illustrates an example of the state-based adaptive adjustment functionality of the frequency converter 130 according to the invention, wherein the proportional gain of the speed controller 140 is adjusted according to the state of the electric motor 110. In this example the proportional gain of the speed controller 140 is adjusted, but alternatively or in addition any other operating parameter of the speed controller 140 may be adjusted according to a state of the electric motor 110. The speed reference of the electric motor 110 as function of time is illustrated with the dashed line 210. The example of FIG. 2 illustrates only one example of the speed reference 110 of the electric motor 110 and the invention is not limited to that. Also, any other type speed references comprising one or more constant speed sections may be used in the context of this invention. The proportional gain of the speed controller 140 as a function of time is illustrated with the solid line 220.

Before the drive of the electric motor 110 is initiated, i.e. when the state of the electric motor 110 is stationary, the drive control unit 120 is configured to define the speed reference of the electric motor 110. Furthermore, the drive control unit 120 is configured to define instants of time, when the state of the electric motor 110 changes based on the defined speed reference. In the example of FIG. 2, at the instant of time of $t_0$ the speed of the electric motor 110 starts to increase causing that the state of the electric motor 110 changes from the stationary to accelerating at the instant of time of $t_0$. The acceleration may be increasing as illustrated in FIG. 2 between the instant of time $t_0$ and the instant of time $t_1$, constant as illustrated in FIG. 2 between the instant of time $t_1$ and the instant of time $t_2$, or decreasing as illustrated in FIG. 2 between the instant of time $t_2$ and the instant of time $t_3$. At the instant of time of $t_3$ the speed of the electric motor 110 reaches a constant speed causing that the state of the electric motor 110 changes from the accelerating to the constant at the instant of time of $t_3$. At the instant of time of $t_4$ the speed of the electric motor 110 starts to decrease from the constant speed causing that the state of the electric motor 110 changes from the constant to decelerating at the instant of time of $t_4$. The deceleration may be increasing as illustrated in FIG. 2 between the instant of time $t_4$ and the instant of time $t_5$, constant as illustrated in FIG. 2 between the instant of time $t_5$ and the instant of time $t_6$, or decreasing as illustrated in FIG. 2 between the instant of time $t_6$ and the instant of time $t_7$. At the instant of time of $t_7$ the drive of the electric motor 110 stops, i.e. the speed of the electric motor 110 at the instant of time $t_7$ is zero, causing that the state of the electric motor 110 changes from the decelerating to the stationary again at the instant of time of $t_7$.

Moreover, before the drive of the electric motor 110 is initiated, the drive control unit 120 is configured to preset the operating parameters of the speed controller 140 of the frequency converter 130 to provide a first response time of the speed controller 140.

The drive control unit 120 may be configured to adjust at least one operating parameter of the speed controller 140 of the frequency converter 130 to provide a second response time of the speed controller 140, after the speed of the electric motor 110 reaches the constant speed according to the speed reference. In other words, after the state of the electric motor 110 changes from the accelerating state to the constant speed state, the drive control unit 120 is configured to adjust at least one operating parameter of the speed controller 140 of the frequency converter 130 to provide the second response time of the speed controller 140. The adjusted value of the at least one operating parameter of the speed controller 140 of the frequency converter 130 may be predefined before the drive of the electric motor 110 or dynamically defined during the drive of the electric motor 110. The adjustment of the at least one operating parameter of the speed controller 140 of the frequency converter 130 may be provided immediately after, i.e. at the earliest when, the state of the electric motor 110 changes according to the speed response. Alternatively, the adjustment of the at least one operating parameter of the speed controller 140 of the frequency converter 130 may be provided after a time delay applied after the state of the electric motor 110 changes according to the speed response as will be discussed later in this application. The second response time of the speed controller 140 is slower than the first response time of the speed controller 140 in order to be able to respond slow enough to the changes of the error value, when the speed of the electric motor 110 is constant, which in turn improves the smoothness of the drive of the electric motor. In the example of FIG. 2 the drive control unit 120 is configured to adjust, i.e. decrease, the proportional gain of the speed controller 140 to provide the second response time, after the instant of time $t_3$, wherein the state of the electric motor 110 changes from the accelerating state to the constant speed state. Alternatively or in addition, the drive control unit 120 may be configured to adjust, the integral time, derivative time, and/or filter time of the speed controller 140 to provide the second response time. The adjusting may be decreasing or increasing depending on the operating parameter to be adjusted as long as the provided second response time is slower than the first response time. The adjusting of the at least one operating parameter of the speed controller 140 of the frequency converter 130 may preferably be abrupt as illustrated in the example of FIG. 2. As discussed above, in addition to the adapting of the response time of the speed controller 140, the adjusting of the at least one operating parameter of the speed controller 140 may cause adapting of the one or more other behavior characteristics of the speed controller 140, e.g. the noise immunity, the overshoot, and/or the settling time. The one or more other behavior characteristics may be increased or decreased depending on the operating parameter to be adjusted.

The drive control unit 120 may further be configured to readjust the at least one operating parameter of the speed controller 140 of the frequency converter 130 to provide again the first response time of the speed controller 140, before the speed of the electric motor 110 initiates to decrease from the constant speed according to the speed reference. In other words, before the state of the electric motor 110 changes from the constant speed state to the decelerating state, the drive control unit 120 is configured to readjust the at least one operating parameter of the speed controller 140 of the frequency converter 130 to provide again the first response time of the speed controller 140. The readjustment of the at least one operating parameter of the speed controller 140 of the frequency converter 130 may be provided immediately before, i.e. at the latest when, the state of the electric motor 110 changes according to the speed response. Alternatively, the readjustment of the at least one operating parameter of the speed controller 140 of the frequency converter 130 may be provided with a time advance before the state of the electric motor 110 changes from the constant speed state to the decelerating state as will be discussed later in this application. In the example of FIG. 2 the drive control unit 120 is configured to readjust, i.e. increase, the proportional gain of the speed controller 140 to provide again the first response time, before the instant of time $t_4$, wherein the state of the electric motor 110 changes from the constant speed state to the decelerating state. Alternatively or in addition, the drive control unit 120 may be configured to readjust, the integral time, derivative time and/or filter time of the speed controller 140 to provide again the first response time. The readjusting may be decreasing or increasing depending on the operating parameter to be readjusted as long as the provided first response time is faster than the second response time. The readjusting of the at least one operating parameter of the speed controller 140 of the frequency converter 130 may preferably be abrupt as illustrated in the example of FIG. 2. As discussed above, in addition to the adapting of the response time of the speed controller 140, the readjusting of the at least one operating parameter of the speed controller 140 may cause adapting of the one or more other behavior characteristics of the speed controller 140, e.g. the noise immunity, the overshoot, and/or the settling time. The one or more other behavior characteristics may be increased or decreased depending on the operating parameter to be readjusted.

The state-based adaptive adjustment functionality of the speed controller 140 enables that at least one operating parameter of the speed controller 140 may be adjusted and readjusted predictably so that the response to the changes of the error value is fast enough, when the speed reference of the electric motor 110 changes, i.e. during acceleration state and deceleration state of the speed of the electric motor 110. Furthermore, the state-based adaptive adjustment functionality of the speed controller 140 enables that the response to the changes of the error value is slow enough, when the speed of the electric motor 110 is constant in order to provide smooth drive of the electric motor 110. The state-based adaptive adjustment functionality of the speed controller 140 is especially preferable for longer drives comprising speed reference with one or more constant speed states, i.e. sections. For example, in high-rise elevator implementations, wherein the drive times with constant speed may be substantially long, e.g. between 10 to 40 seconds or even longer in super high-rise elevator elevators, the state-based adaptive adjustment functionality of the speed controller 140 is preferable.

According to an example embodiment, the drive control unit 120 may be configured to apply a time delay 330 after the state of the electric motor 110 changes from the accelerating state to the constant speed state, before adjusting the at least one operating parameter of the speed controller 140 of the frequency converter 130. In other words, the drive control unit 120 may be configured to adjust the at least one operating parameter of the speed controller 140 of the frequency converter 130 after the time delay 330 applied after the constant speed is achieved. Alternatively or in addition, the drive control unit 120 may be configured to readjust the at least one operating parameter of the speed controller 140 of the frequency converter 130 with a time advance 340 applied before the state of the electric motor 110 changes from the constant to the decelerating. In other words, the drive control unit 120 may be configured to apply the time advance 340 when readjusting the at least one operating parameter of the speed controller 140 before the deceleration from the constant speed is initiated.

Figure 3:
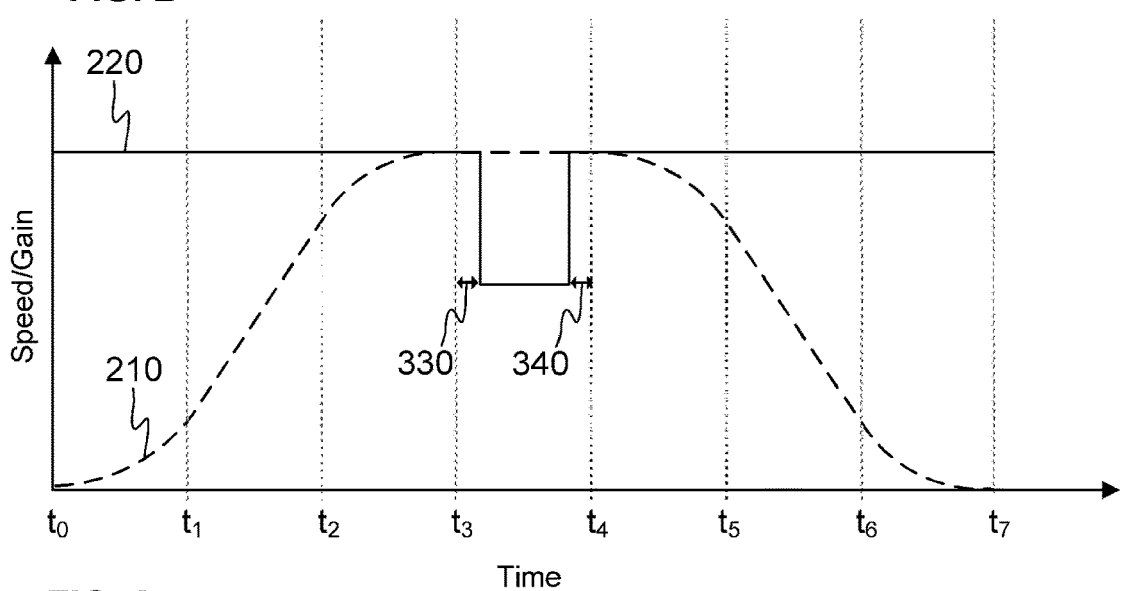
FIG. 3 illustrates another example of the state-based adaptive adjustment functionality of a frequency converter according to the invention.

FIG. 3 illustrates another example of the state-based adaptive adjustment functionality of the frequency converter 130 according to the invention, wherein the proportional gain of the speed controller 140 is adjusted. The example of FIG. 3 is otherwise similar to the example illustrated in FIG. 2, except the time delay 330 and the time advance 340 are applied. In this example the proportional gain of the speed controller 140 is adjusted, but alternatively or in addition any other operating parameter of the speed controller 140 may be adjusted according to the state of the electric motor 110. The adjusting and/or readjusting of the at least one operating parameter of the speed controller 140 of the frequency converter 130 may preferably be abrupt as illustrated in the example of FIG. 3. The drive control unit 120 is configured to apply the time delay 330 after the state of the electric motor 110 changes from the accelerating state to the constant speed state, i.e. after the instant of time $t_3$, before adjusting, i.e. decreasing, the proportional gain of the speed controller 140. Furthermore, the drive control unit 120 is configured to readjust the at least one operating parameter of the speed controller 140 with the time advance 340 before the state of the electric motor 110 changes from the constant speed state to the decelerating state, i.e. before the instant of time $t_4$.

The time delay 330 and the time advance 340 may be considerably shorter than the constant speed section, i.e. the period of time during which the speed of the electric motor 110 is constant, in order to enable the change from the first response time to the second response time and vice versa during the constant speed section. The time delay 330 may be at least such that the speed of the of the electric motor has reached and settled to the nominal speed, i.e. the time delay 330 may preferably be at least as long as a settling time of the speed controller 140. The time advance 340 may preferably be long enough so that the speed controller 140 may have enough time to adjust the operating parameters of the speed controller 140 before the deceleration initiates. The time advance may preferably be approximately 10 control cycles, e.g. between 8 to 12 control cycles. Applying the time delay 330 and/or time advance 340 in the state-based adaptive adjustment functionality of the speed controller 140, enables ensuring that the response to the changes of the error value is fast enough, when the speed reference of the electric motor 110 changes, i.e. during acceleration state and deceleration state of the electric motor 110.

Figure 4:
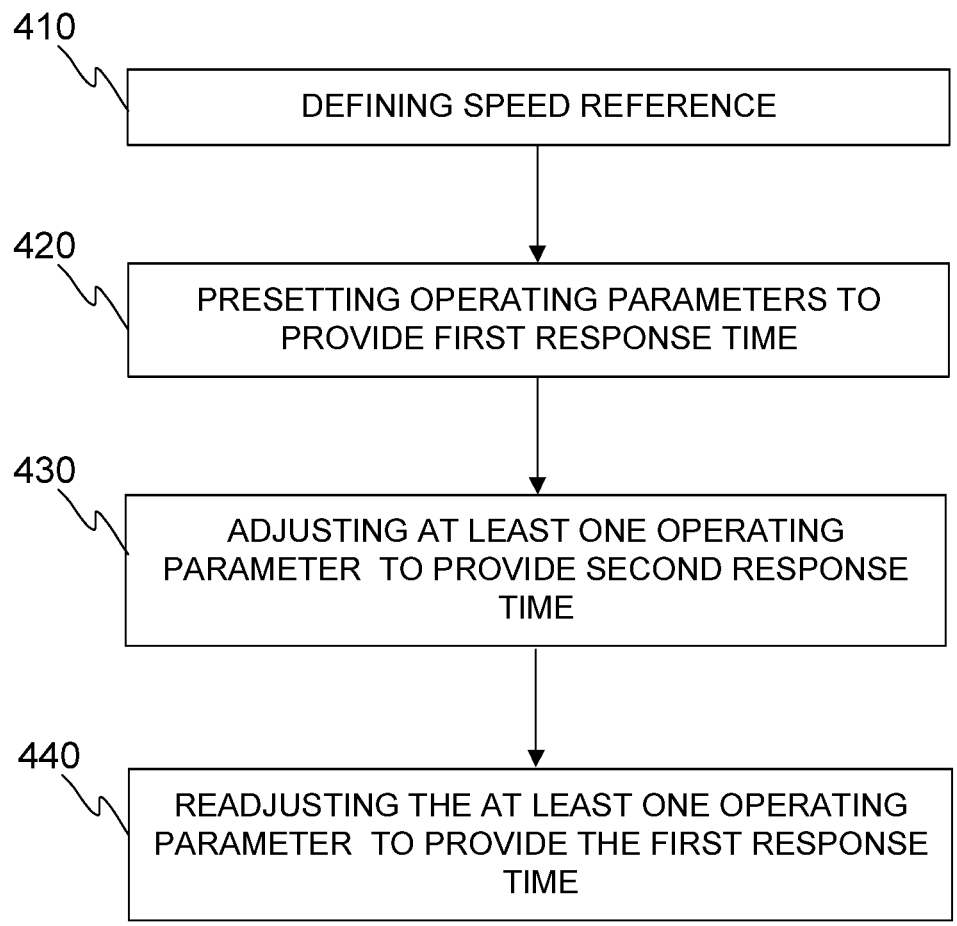
FIG. 4 illustrates schematically an example of a method according to the invention.

Above the invention is described relating to the drive system 100 according to the invention. Next an example of a method for controlling a drive system according to the invention is described by referring to FIG. 4, which illustrates schematically the invention as a flow chart. At the step 410, the drive control unit 120 defines a speed reference of the electric motor 110, before the drive of the electric motor 110 is initiated, i.e. when the state of the electric motor 110 is stationary. Furthermore, the drive control unit 120 is configured to define instants of time, when the state of the electric motor 110 changes based on the defined speed reference. The different states of the electric motor 110 may be stationary, accelerating, constant speed, and decelerating. One or more of the states of the electric motor 110 may further comprise one or more sub-states, e.g. increasing acceleration, decreasing acceleration, constant acceleration, increasing deceleration, decreasing deceleration, constant deceleration, etc. These instants of time for the changes of the states may be defined before the drive of the electric motor 110 is initiated, i.e. when the state of the electric motor 110 is stationary in order to enable adjusting and readjusting at least one operating parameter of the speed controller 140 predictably.

At the step 420, before the drive of the electric motor 110 is initiated, the drive control unit 120 presets the operating parameters of the speed controller 140 of the frequency converter 130 to provide a first response time of the speed controller 140. The steps 410 and 420 may also be performed in reversed order. After the steps 410 and 420, the drive of the electric motor 110 may be initiated.

At the step 430, the drive control unit 120 adjusts at least one operating parameter of the speed controller 140 of the frequency converter 130 to provide a second response time of the speed controller 140, after the speed of the electric motor 110 reaches the constant speed according to the speed reference. In other words, after the state of the speed of the electric motor 110 changes from the accelerating state to the constant speed state, the drive control unit 120 adjusts at least one operating parameter of the speed controller 140 of the frequency converter 130 to provide the second response time of the speed controller 140. The adjusted value of the at least one operating parameter of the speed controller 140 of the frequency converter 130 may be predefined before the drive of the electric motor 110 or dynamically defined during the drive of the electric motor 110. The adjustment of the at least one operating parameter of the speed controller 140 of the frequency converter 130 may be provided immediately after, i.e. at the earliest when, the state of the electric motor 110 changes according to the speed response. Alternatively, the adjustment of the at least one operating parameter of the speed controller 140 of the frequency converter 130 may be provided after a time delay applied after the state of the electric motor 110 changes according to the speed response, i.e. after the speed of the electric motor 110 reaches the constant speed according to the speed reference. The second response time of the speed controller 140 is slower than the first response time of the speed controller 140 in order to be able to respond slow enough to the changes of the error value, when the speed of the electric motor 110 is constant, which in turn improves the smoothness of the drive of the electric motor 110. The drive control unit 120 may adjust the proportional gain, the integral time, the derivative time, and/or filter time of the speed controller 140 to provide the second response time, after the state of the electric motor 110 changes from the accelerating state to the constant speed state. The adjusting may be decreasing or increasing depending on the operating parameter to be adjusted as long as the provided second response time is slower than the first response time. The adjusting of the at least one operating parameter of the speed controller 140 of the frequency converter 130 may preferably be abrupt.

At the step 440, the drive control unit 120 may further readjust the at least one operating parameter of the speed controller 140 of the frequency converter 130 to provide again the first response time of the speed controller 140, before the speed of the electric motor 110 initiates to decrease from the constant speed according to the speed reference. In other words, before the state of the electric motor 110 changes from the constant speed state to the decelerating state, the drive control unit 120 readjusts the at least one operating parameter of the speed controller 140 of the frequency converter 130 to provide again the first response time of the speed controller 140. The readjustment of the at least one operating parameter of the speed controller 140 of the frequency converter 130 may be provided immediately before, i.e. at the latest when, the state of the electric motor 110 changes according to the speed response. Alternatively, the readjustment of the at least one operating parameter of the speed controller 140 of the frequency converter 130 may be provided with a time advance applied before the state of the electric motor 110 changes from the constant speed state to the decelerating state, i.e. before the deceleration from the constant speed is initiated according to the speed reference. The drive control unit 120 may readjust the proportional gain, the integral time, the derivative time, and/or the filter time of the speed controller 140 to provide the first response time, before the state of the electric motor 110 changes from the constant speed state to the decelerating state. The readjusting may be decreasing or increasing depending on the operating parameter to be adjusted as long as the provided first response time is faster than the second response time. The readjusting of the at least one operating parameter of the speed controller 140 of the frequency converter 130 may preferably be abrupt. As discussed above, in addition to the adapting the response time of the speed controller 140, the adjusting and/or readjusting of the at least one operating parameter of the speed controller 140 may cause adapting of the one or more other behavior characteristics of the speed controller 140, e.g. the noise immunity, the overshoot, and/or the settling time. The one or more other behavior characteristics may be increased or decreased depending on the operating parameter to be adjusted and/or readjusted.

Figure 5:
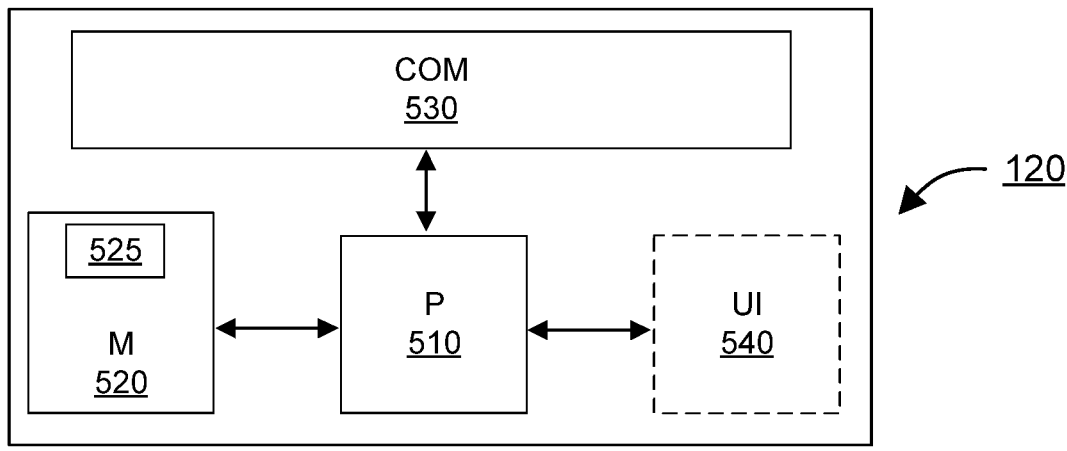
FIG. 5 discloses a schematic example of a drive control unit according to the invention.

FIG. 5 discloses a schematic example of the drive control unit 120 according to the invention. The drive control unit 120 may be a separate unit or may be comprised in or as a part of other units, e.g. the frequency converter 130 and/or in elevator implementations the drive control unit 120 may be comprised in or as a part of an elevator control unit. The drive control unit 120 may also be arranged in distributed manner at more than two locations or in more than two units. The drive control unit 120 may comprise one or more processors 510, one or more memories 520 being volatile or non-volatile for storing portions of computer program code 525 and any data values, one or more communication interface units 530 and possibly one or more user interface units 540. The mentioned elements may be communicatively coupled to each other with e.g. an internal bus. The processor may be configured to execute at least some portion of a computer program code 525 stored in the memory 520 causing the processor 510, and thus the drive control unit 120, to perform desired tasks, e.g. the operations of the drive control unit 120 and/or at least some of the method steps described above. The processor 510 may thus be arranged to access the memory 520 and retrieve and store any information therefrom and thereto. For sake of clarity, the processor herein refers to any unit suitable for processing information and control the operation of the drive control unit, among other tasks. The operations may also be implemented with a microcontroller solution with embedded software. Similarly, the memory 520 is not limited to a certain type of memory only, but any memory type suitable for storing the described pieces of information may be applied in the context of the present invention. The communication interface unit 530 provides an interface for communication with any external unit. The communication interface unit may be based on one or more known communication technologies, either wired or wireless, in order to exchange pieces of information. The one or more user interface units 540 may comprise one or more input/output (I/O) devices, such as buttons, keyboard, touch screen, microphone, loudspeaker, display and so on, for receiving input and outputting information.

The term "constant speed" of the electric motor 110 used throughout this application may preferably be the nominal speed of the electric motor 110. Alternatively, at least in some implementations, there may be a need to drive the electric motor 110 with one or more different constant speeds, which are not necessarily the nominal speed of the electric motor 110. For example, the elevator may comprise a high-rise elevator shaft, which may be divided into at least two different sections, e.g. into a shuttle section and one or more destination floor sections. Therefore, the electric motor 110 may be configured to use a nominal constant speed of the electric motor 110 for the shuttle section and a lower constant speed, when operating in other sections.

As discussed above, the invention may be implemented in cyclical applications. The above discussed adaptive adjustment functionality of the speed controller 140 is especially beneficial for driving electric motors 110 with a duty cycle, i.e. load cycle, comprising constant speed sections in their cyclic speed reference patterns. The drive system 100 and the method for controlling the drive system 100 according to the invention enable improvement of the driving accuracy and/or the driving comfort of the electric motor 110 without additional costs.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A drive system for driving an electric motor, the drive system comprising a drive control unit and a frequency converter comprising a speed controller, wherein the drive control unit is configured to:
define a speed reference of the electric motor, wherein the speed reference represents the speed of the electric motor as a function of time;
preset operating parameters of the speed controller of the frequency converter to provide a first response time of the speed controller, before a drive of the electric motor is initiated according to the speed reference;

adjust at least one operating parameter of the speed controller of the frequency converter to provide a second response time of the speed controller, after the speed of the electric motor reaches a constant speed according to the speed reference, wherein the second response time of the speed controller is slower than the first response time of the speed controller; and readjust the at least one operating parameter of the speed controller of the frequency converter to provide the first response time of the speed controller, before a deceleration from the constant speed is initiated according to the speed reference, wherein the drive control unit is configured to apply a time delay after the constant speed is achieved and before adjusting the at least one operating parameter of the speed controller of the frequency converter to provide the second response time of the speed controller, and to readjust the at least one operating parameter of the speed controller of the frequency converter to provide the first response time of the speed controller with a time advance applied before the deceleration from the constant speed is initiated, such that during a period where the speed of the electric motor maintains the constant speed according to the speed reference, the speed controller of the frequency converter sequentially achieves the first response time, then the second response time and then the first response time.

2. The drive system according to claim 1, wherein the speed controller is a proportional-integral-derivate controller, PID controller, comprising at least the following operating parameters: proportional gain, integral time, derivative time.

3. The drive system according to claim 1, wherein the speed controller is a proportional-integral controller, PI controller, comprising at least the following operating parameters: proportional gain, integral time.

4. The drive system according to claim 2, wherein the at least one operating parameter of the speed controller further comprises: filter time of the speed of the electric motor and/or filter time of an error value of the speed controller.

5. The drive system according to claim 1, wherein the adjusting and/or readjusting of the at least one operating parameter of the speed controller causes adapting of one or more of the following behavior characteristics of the speed controller: a noise immunity, an overshoot, a settling time.

6. The drive system according to claim 1, wherein the drive system-is used for driving the electric motor of a conveyor, wherein the conveyor is an elevator, an escalator, or a moving walkway.

7. A method for controlling a drive system for driving an electric motor, the drive system comprising a drive control unit and a frequency converter comprising a speed controller, wherein the method comprises:

defining a speed reference of the electric motor, wherein the speed reference represents the speed of the electric motor as a function of time;

presetting operating parameters of the speed controller of the frequency converter to provide a first response time of the speed controller, before a drive of the electric motor is initiated according to the speed reference;

adjusting at least one operating parameter of the speed controller of the frequency converter to provide a second response time of the speed controller, when the speed of the electric motor reaches a constant speed according to the speed reference, wherein the second response time of the speed controller is slower than the first response time of the speed controller;

applying a time delay after the constant speed is achieved and before adjusting the at least one operating parameter of the speed controller of the frequency converter to provide the second response time of the speed controller; and readjusting the at least one operating parameter of the speed controller of the frequency converter to provide the first response time of the speed controller with a time advance applied before a deceleration from the constant speed of the electric motor is initiated according to the speed reference, wherein during a period where the speed of the electric motor maintains the constant speed according to the speed reference, the speed controller of the frequency converter sequentially achieves the first response time, then the second response time and then the first response time.

8. The method according to claim 7, wherein the speed controller is a proportional-integral-derivate controller, PID controller, comprising at least the following operating parameters: proportional gain, integral time, derivative time.

9. The method according to claim 7, wherein the speed controller is a proportional-integral controller, PI controller, comprising at least the following operating parameters: proportional gain, integral time.

10. The method according to claim 8, wherein the at least one operating parameter of the speed controller further comprises: filter time of the speed of the electric motor and/or filter time of an error value of the speed controller.

11. The method according to claim 7, wherein the adjusting and/or readjusting of the at least one operating parameter of the speed controller causes adapting of one or more of the following behavior characteristics of the speed controller: a noise immunity, an overshoot, a settling time.

12. The method according to claim 7, wherein the method is implemented for driving the electric motor of a conveyor, wherein the conveyor is an elevator, an escalator, or a moving walkway.

13. The drive system according to claim 3, wherein the at least one operating parameter of the speed controller further comprises: filter time of the speed of the electric motor and/or filter time of an error value of the speed controller.

* * * * *